United States Patent [19]
Morrison

[11] 3,790,765
[45] Feb. 5, 1974

[54] GOVERNOR WITH INTEGRATOR RESET

[75] Inventor: Terry Morrison, Elmwood, Conn.

[73] Assignee: Chandler Evans Inc., West Hartford, Conn.

[22] Filed: Feb. 1, 1973

[21] Appl. No.: 328,864

[52] U.S. Cl. .......................... 235/150.1, 60/39.28 R
[51] Int. Cl. ............................................. F02c 9/08
[58] Field of Search 235/150.1; 60/39.28 R, 39.28 T

[56] References Cited
UNITED STATES PATENTS
3,520,133   7/1970   Loft et al. ........................... 60/39.14

Primary Examiner—Eugene G. Botz

[57] ABSTRACT

A control system employing, in one of a plurality of control loops, an isochronous governor and means for controlling the output of the integrator of the governor as a function of the control signal selected by the system logic. During closed loop control under command of the isochronous governor the integrator operates normally whereas during isochronous governor open loop operation the integrator is operated closed loop on the selected control system output.

9 Claims, 1 Drawing Figure

PATENTED FEB 5 1974 3,790,765
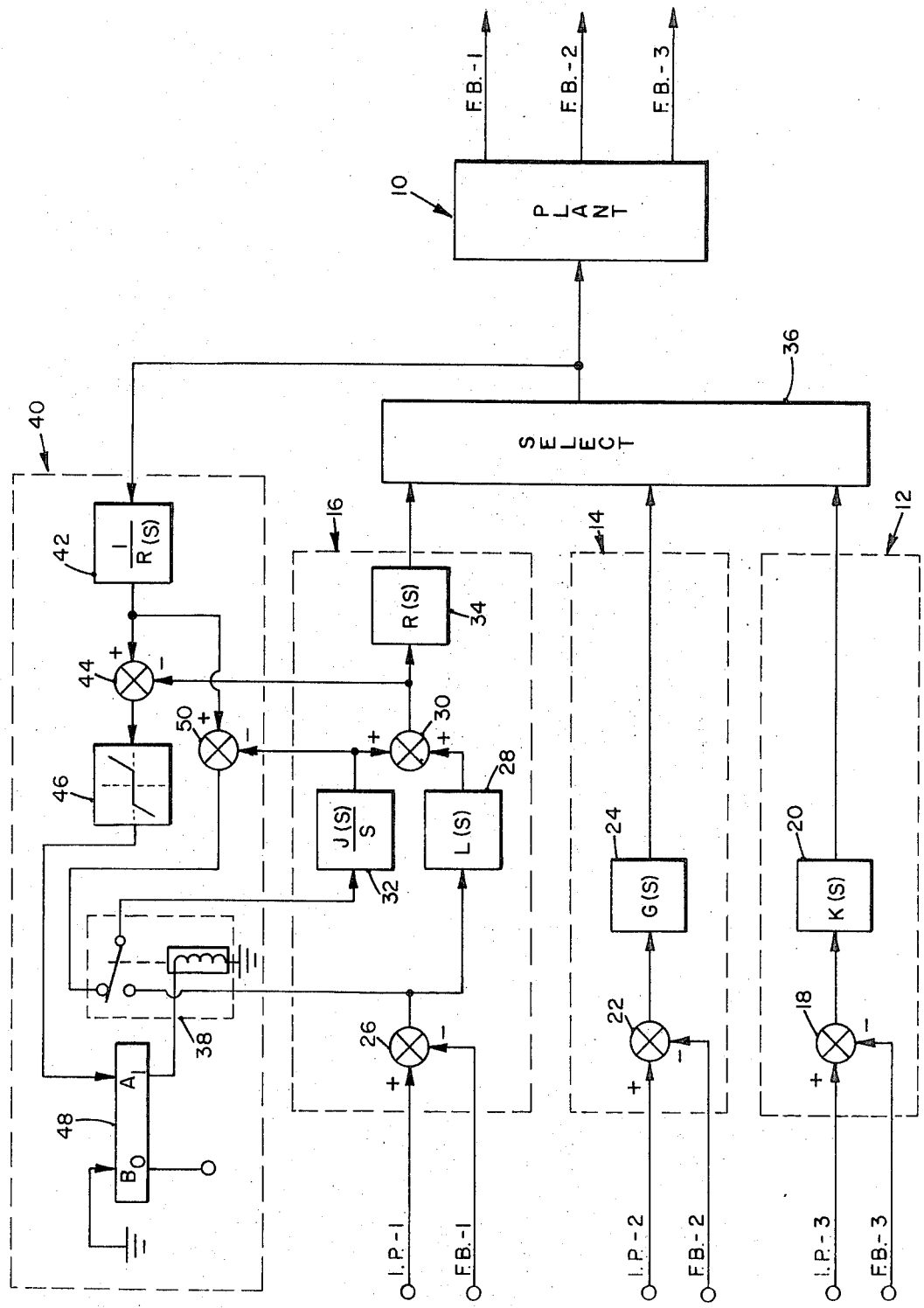

GOVERNOR WITH INTEGRATOR RESET

BACKGROUND OF THE INVENTION:

1. Field of the Invention

The present invention relates to the enhancement of the stability of the control exercised over a plant and particularly a power plant of the fuel consuming rotary machine type. More specifically, this invention is directed to isochronous controls for gas turbine engines. Accordingly, the general objects of the present invention are to provide novel and improved methods and apparatus of such character.

2. Description of the Prior Art

While not limited thereto in its utility, the present invention is particularly well suited for use in a power turbine governor which forms a portion of the control of a free turbine type gas generator. Isochronous controls for free turbine engines, particularly as employed on helicopters and other vehicles, are well known in the art. The control for a free turbine engine typically includes a plurality of control loops, or operational modes, and logic circuitry which selects, for fuel control purposes, a signal commensurate with the lowest fuel flow level as requested by the several control loops. Thus, by way of example, an engine control may include a first sub-loop which generates a fuel flow signal commensurate with engine torque limitations, a second sub-loop which generates a fuel flow signal commensurate with the maximum permissible gas generator discharge temperature and a third sub-loop or isochronous governor which generates a fuel flow signal as a function of the selected free turbine speed. This third sub-loop will typically be a proportional plus integral type control. The three sub-loops will be connected in parallel and, as noted, logic circuitry will be provided to select the appropriate output signal for control purposes.

The problems associated with controlling the integrator of an isochronous governor are well known. For systems with parallel modes of operation, with selection of the appropriate mode by control logic, the modes that include integrators with error nulling features, such as isochronous governors, will not perform satisfactorily if the integrator becomes saturated during open loop operation. Restated, when the output of the loop or subsystem including the integrator is not selected by the control logic, and the feedback signal from the "plant" under control is thus not commensurate with the output of the integrator, the integrator will no longer be trying to null an error and may become saturated. Should the integrator become saturated its output signal will be so high that the isochronous governor will not resume control when it should. The problem being described will, for example, arise whenever the isochronous governor portion of the control has temporarily lost control of the plant. Under such circumstances speed errors will integrate open loop, as described, causing the integrator output to ramp eventually to its maximum value. When this occurs the governor proportional path will require a large speed error before the total isochronous governor output signal is again low enough to win over the other engine control modes.

Continuing with a discussion of the conditions which may cause the integrator of an isochronous governor to saturate, and again considering the example of a fuel control for a free turbine type engine, the condition of integrator saturation will also result if engine power demand is greater than the operators power lever setting. As briefly eluded to above, integrator saturation may also result when the other system control loops; for example, temperature limiting or torque limiting; are temporarily in control.

SUMMARY OF THE INVENTION

The present invention overcomes the above briefly discussed and other disadvantages of the prior art by maintaining the output of the integrator of an isochronous governor at a value that will minimize transient speed errors when plant control returns to the governor. In accordance with the invention the output of the integrator of an isochronous governor will be controlled as a function of the control output selected by the system logic thereby allowing smooth transition from one mode of control to another. Thus, the present invention contemplates the maintenance of a closed loop around the integrator of an ischronous control at all times. This closed loop operation is achieved during open loop operation of the control mode containing the integrator by "locking" the integrator onto the system output. During closed loop control by the isochronous governor the integrator will be permitted to operate normally.

The present invention thus comprises an integral reset technique which transfers the control over the integrator of an isochronous governor from normal closed loop about the governor to closed loop about the plant being controlled commensurate respectively with whether the isochronous governor of some other control loop is selected for instantaneous control purposes.

BRIEF DESCRIPTION OF THE DRAWING

The present invention may be better understood and its numerous objects and advantages will become apparent to those skilled in the art by reference to the accompanying drawing which is a logic block diagram of a preferred embodiment of the invention.

DESCRIPTION OF THE DISCLOSED EMBODIMENT:

As shown in the drawing, the control system for a plant 10 comprises three modes or loops indicated generally at 12, 14 and 16. Plant 10 may, for example, comprise a free turbine type engine and, for purposes of this description, it will be presumed that engine or power plant 10 is the engine of a helicopter. Feedback signals commensurate with the control parameters to which each of the loops 12, 14 and 16 are responsive are sensed by suitable condition responsive devices on power plant 10 and signals commensurate with the sensed parameters are fed back to the control loops. Thus, by way of example, the control input IP-1 to loop 12 may be a signal commensurate with maximum permissible gas generator discharge temperature for the prevailing ambient conditions and the feedback signal to loop 12, FB-1, will be commensurate with actual discharge temperature. In control loop 12 the input signals are compared, for example in a summing circuit 18, and an "error" signal will be generated and applied to a function generator 20. Function generator 20 may be of the type well known in the art which schedules fuel flow as a function of the proximity of the instantaneous temperature limits. The output of loop 12 will thus be a fuel flow signal commensurate with the operational temperature limits of power plant 10.

Similarly, the control input IP-2 to loop 14 may be a signal commensurate with the torque limits of the power turbine, for example as provided by an internal reference voltage generator position, and the feedback signal, FB-2, to loop 14 will be commensurate with the actual torque being developed. The summing circuit 22 in loop 14 will thus generate an effective torque error signal which is applied to function generator 24. Function generator will provide a fuel flow command signal commensurate with the proximity of the acutal torque being developed by the engine to the maximum permissible torque.

Control loop 16 comprises, with the exception to be discussed below, an isochronous governor of a type well known in the art. The control input IP-3 to governor 16 may be a signal commensurate with selected free turbine speed while the feedback signal applied to the isochronous governor from plant 10 may be a signal commensurate with actual instantaneous free turbine speed. These two input signals are compared in a summing circuit 26 in order to develop a speed error signal. The speed error signal is applied to a proportional transfer function generator 28 which may comprise a gain stage; i.e., an operational amplifier. Function generator 28 provides an output signal proportional to speed error. This output signal is applied to a further summing circuit 30.

Under normal operating conditions; i.e., with the isochronous governor controlling operation of plant 10; the speed error signal from summing circuit 26 is also applied to an integrator 32. The integrator 32 may comprise a high gain amplifier with an RC feedback path. The output of integrator 32 responds to the speed error signal and either increases or decreases at a rate dependant on the sign and magnitude of the error. The output of integrator 32 is also applied to summing circuit 30 in the interest of generating a combined proportional plus integral control signal.

The output of summing circuit 30 is passed through a transfer function generator 34 which relates speed error to the input requirements of the plant; fuel flow being the input requirement of interest in the aircraft environment being described. Function generator 34 may comprise an operational amplifier gain stage or, in some instances, a digital function generator if the generation of a schedule is required.

The outputs of control loops 12, 14 and 16, as respectively derived from function generators 20, 24 and 34, are applied to a logic select circuit 36. Circuit 36 may be a "lowest wins" selector circuit of a type well known in the art. Circuit 36 selects the fuel control signal, as generated by loops 12, 14 and 16, commensurate with the lowest commanded fuel flow and delivers this signal to the fuel control of plant 10.

The control circuitry described above is conventional and does not comprise part of the present invention. The present invention resides in the incorporation, in the control circuitry, of an integral reset function as will be described below.

As may be seen from the drawing, in accordance with the present invention the path for the delivery of the speed error signal from summing circuit 26 to integrator 32 may be interrupted by means of a switching device 38. The heart of the present invention resides in the manner of controlling the operation of the switching device 38 and in the generation of a signal for application to the input of integrator 32 when the normal connection between summing circuit 26 and integrator 32 is interrupted. The integral reset circuitry by which the control of device 38 is achieved is indicated generally at 40. The control signal selected by logic circuit 36 is applied as a first input to circuit 40. Further inputs to circuit 40 are the outputs of integrator 32 and summing circuit 30 of isochronous governor 16. In circuit 40 the selected control output will be applied to a function generator 42 which generates the inverse of the function of generator 34. The output of function generator 42 is compared, in a summing circuit 44, with the output of summing circuit 30. This comparison will produce an output signal from summing circuit 44 only when the control signal selected by circuit 36 is being provided by a sub-loop other than governor 16.

The output of summing circuit 44, when present, is applied to a dead band circuit 46. The dead band generator may comprise merely a bidirectional, high gain amplifier circuit including a pair of back-to-back amplifiers. Circuit 46 provides a high level output signal when either of the inputs to summing circuit 44 exceeds the other by a predetermined amount and provides no output signal at all other times.

The output signals provided by dead band generator 46 are applied to one input of a comparator circuit 48. While comparator circuit 48 may take many forms, the comparator has been represented in the drawing as an amplifier referenced to ground potential. The comparator 48 thus functions as a bistable device to provide control signals for the operation of switching device 38; the switching device being represented as a solenoid operated switch for purposes of explanation and, in practice, actually comprising an electronic switch.

The output from inverse function generator 42 is also applied to a summing circuit 40 where it is compared with the output of integrator 32. This comparison produces an output signal which is commensurate with the difference between the output of the integrator and the selected control signal. This output of summing circuit 50 is, with switching device 38 in the state shown, fed back as the input to integrator 32.

To summarize operation of the invention, when logic circuit 36 selects the output from isochronous governor 16, the output of summing circuit 44 in integral reset circuit 40 will be zero. Under these conditions there will be no output from the dead band generator 46 and the comparator circuit 48 will switch to its "one" state and will "energize" switching device 38. The "energization" of the switching device 38 will result in the speed error signal provided by summing circuit 26 being applied as the input to integrator 32. This allows normal operation during the time the isochronous governor is controlling plant 10.

When circuit 36 selects, for purposes of controlling plant 10, the output of either of control loops 12 or 14, the output signal of summing circuit 44 will normally exceed the dead band stabilization. This will result in the inputs to comparator 48 being unequal thereby switching the output of the comparator and "deenergizing" the switching device 38. In its "deenergized" state, the switching device 38 completes the reset circuit as shown and applies the output of summing circuit 50 to the input of integrator 32. This action leaves the integrator operation closed loop and the output of integrator 32 will track the control output; that is the output of the integrator multiplied by the transfer function of function generator 34 will equal the selected output of circuit 36. However, during the time integrator 32 is operated closed loop on the selected output of either of loops 12 or 14 any speed error will, through the nonintegral path including proportional function generator 28, cause the input to logic circuit 36 provided by governor 16 to differ from the selected control output thus unaffecting the results of the selection of the output from either of loops 12 or 14 by logic circuit 36.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In a plant control system, said system including a plurality of control loops for generating control signals commensurate with different plant variable operating parameters and means for selecting one of said control signals for control purposes, one of said control loops including means for integrating a signal commensurate with a first control variable error, the improvement comprising:

switch means having at least a pair of input connections;

means for delivering said first control variable error signal to a first input connection of said switch means;

means for delivering signals passed by said switch means to the input of the integrating means in said one control loop;

means generating a signal commensurate with the difference between the output of the integrating means in said one control loop and the selected control signal;

means connecting the output of said difference signal generating means to a second input connection of said switch means; and switch means control signal generating means responsive to the selected control signal and the control signal provided by said one of said control loops, said switch means control signal generating means providing output signals indicative of whether output of said one of said control loops has been selected for control purposes whereby said switch means will pass the signal commensurate with first control variable error when the output of said one control loop is selected and said switch means will pass the output of said difference signal generating means when the output of another control loop is selected.

2. The apparatus of claim 1 wherein said switch means control signal generating means comprises:

first comparator means, said first comparator means having a first input connected to receive the control system output signal and a second input connected to receive from said one of said control loops a signal commensurate with the requisite control system reaction as a function of the first control variable error; and means connected to said first comparator means and responsive to signals provided thereby for producing switching command signals.

3. The apparatus of claim 1 wherein said difference signal generating means comprises:

comparator means connected to receive the output of the integrating means in said one control loop as a first input signal and to receive as a second input a signal commensurate with the control signal selected by the system.

4. The apparatus of claim 2 wherein said difference signal generating means comprises:

second comparator means connected to receive the output of the integrating means in said one control loop as a first input signal and to receive as a second input a signal commensurate with the control signal selected by the system.

5. The apparatus of claim 2 wherein said switching command signal producing means comprises:

dead band signal generating means responsive to the output of said first comparator means for providing a signal having a polarity indicative of the results of the comparison formed by said first comparator means; and bistable means connected to said dead band signal generating means and responsive to output signals provided thereby for generating switch means control signals.

6. The apparatus of claim 4 wherein said switching command signal producing means comprises:

dead band signal generating means responsive to the output of said first comparator means for providing a signal having a polarity indicative of the results of the comparison formed by said first comparator means; and bistable means connected to said dead band signal generating means and responsive to output signals provided thereby for generating switch means control signals. signal, said function generator means producing an inversion of the function generated by the output function generator in said one control loop; and 7. The apparatus of claim 2 wherein said one of said control loops includes an output function generator and wherein said first comparator means comprises:

function generator means for receiving the selected system control summing circuit means receiving the output of said function generator means and the input to the said one control loop out-put function generator.

8. The apparatus of claim 7 wherein said difference signal generating means comprises:

second comparator means connected to receive the output of the integrating means in said one control loop as a first input signal and to receive as a second input the output of said function generator means.

9. The apparatus of claim 8 wherein said switching command signal producing means comprises:

dead band signal generating means responsive to the output of said summing circuit means for providing a signal having a polarity indicative of the results of the comparison formed by said summing circuit means; and bistable means connected to said dead band signal generating means and responsive to output signals provided thereby for generating switch means control signals.

* * * * *

UNITED STATES PATENT OFFICE
CERTIFICATE OF CORRECTION

Patent No. 3,790,765          Dated February 5, 1974

Inventor(s) Terry Morrison

It is certified that error appears in the above-identified patent and that said Letters Patent are hereby corrected as shown below:

IN THE CLAIMS:

Claim 6, at column 6, lines 35-38, after "signals." cancel "signal, said function generator means producing an inversion of the function generated by the output function generator in said one control loop; and"

Claim 7, at column 6, line 43, after "control" insert --signal, said function generator means producing an inversion of the function generated by the output function generator in said one control loop; and--

Signed and sealed this 6th day of August 1974.

(SEAL)
Attest:

McCOY M. GIBSON, JR.          C. MARSHALL DANN
Attesting Officer             Commissioner of Patents